United States Patent [19]

Schmitt

[11] Patent Number: 4,582,137
[45] Date of Patent: Apr. 15, 1986

[54] POLYMERIZABLE SURFACTANTS FOR PERMEABILITY CONTROL IN WATERFLOODING

[75] Inventor: Kirk D. Schmitt, Pennington, N.J.

[73] Assignee: Mobil Oil Corporation, New York, N.Y.

[21] Appl. No.: 666,530

[22] Filed: Oct. 30, 1984

[51] Int. Cl.⁴ .................. E21B 33/138; E21B 43/22
[52] U.S. Cl. .................................. 166/270; 166/273; 166/274; 166/294; 252/8.55 D
[58] Field of Search ............ 166/269, 270, 273, 274, 166/275, 294, 295, 300; 252/8.55 D; 523/130

[56] References Cited

U.S. PATENT DOCUMENTS

| | | | |
|---|---|---|---|
| 3,306,356 | 2/1967 | Sparlin | 166/295 |
| 3,490,533 | 1/1970 | McLaughlin | 166/300 X |
| 4,042,030 | 8/1977 | Savins et al. | 252/8.55 D X |
| 4,160,480 | 7/1979 | Schievelbein et al. | 166/269 |
| 4,161,982 | 7/1979 | Schievelbein et al. | 166/269 |
| 4,161,983 | 7/1979 | Schievelbein et al. | 166/269 |
| 4,181,178 | 1/1980 | Savins | 166/274 |
| 4,184,549 | 1/1980 | Schievelbein | 166/269 |
| 4,190,109 | 2/1980 | Barton, Jr. | 166/270 |
| 4,192,382 | 3/1980 | Schievelbein et al. | 166/269 |
| 4,194,563 | 3/1980 | Schievelbein | 166/273 |
| 4,317,893 | 3/1982 | Chen et al. | 252/8.55 D X |
| 4,370,243 | 1/1983 | Chen et al. | 252/8.55 D |
| 4,458,760 | 7/1984 | Hurd | 166/269 X |
| 4,521,317 | 6/1985 | Landau et al. | 252/8.55 D |

FOREIGN PATENT DOCUMENTS 1168945 10/1969 United Kingdom ................ 166/295

OTHER PUBLICATIONS

Hess et al., "Chemical Method For Formation Plugging", J. Pet. Tech. 551, May 1971.
Terry et al., "Correlation of Gelation Times For Polymer Agents", Soc. Pet. Eng. J. 229, Apr. 1981.

*Primary Examiner*—George A. Suchfield
*Attorney, Agent, or Firm*—Alexander J. McKillop; Michael G. Gilman; Charles J. Speciale

[57] ABSTRACT

A process for recovering petroleum from a subterranean containing formation comprising injecting a polymerizable surfactant containing oil displacing fluid into the formation to reduce the permeability of the oil depleted high permeable zone.

9 Claims, No Drawings

POLYMERIZABLE SURFACTANTS FOR PERMEABILITY CONTROL IN WATERFLOODING

BACKGROUND OF THE INVENTION

This invention relates to an enhanced oil recovery process and more particularly to an oil recovery process for use in subterranean petroleum formations containing two or more zones which differ from one another in permeability.

It is well known that only a small fraction of the petroleum originally present in a subterranean petroleum formation is recoverable by primary production i.e. by allowing the oil to flow to the surface of the earth as a consequence of naturally occurring energy forces. Secondary waterflooding of many reservoirs recovers only a small portion of the remaining oil because of the presence within the reservoir of a number of strata of widely varying permeability.

In general, secondary recovery processes comprise injecting water into the formation of displace petroleum through the formation and finally to the surface of the earth. The total oil recovery efficiency of the process is frequently poor because when the fluid is injected into a heterogeneous reservoir, the fluid passes primarily through the most permeable zones and little or none of the fluid passes through the lower permeability zones. If only two strata are present differing by only a factor of two in their permeability nearly all flow will begin through the more permeable stratum. This flow of water through the more permeable stratum removes some oil which will result in the more permeable stratum becoming even more permeable, thus aggravating the problem.

Water does not displace oil effectively since water and oil are immiscible and the interfacial tension between water and oil is quite high. Thus, surfactants are generally added to the flood water to reduce the interfacial tension between the injected aqueous fluid and the formation petroleum thereby increasing the microscopic displacement efficiency of the injected aqueous fluid. However, even if the surface tension between the injected aqueous fluid and the petroleum present in the subterranean reservoir can be reduced by incorporating surfactants into the injected fluid, the total oil recovery efficiency of the process is still frequently poor.

Several U.S. patents disclose the concept of injecting various surfactants to selectively plug the more permeable strata so that the waterflooding efficiency will be improved in the less permeable strata. In this regard, Schievelbein et al. in a series of U.S. patents, namely U.S. Pat. No. 4,160,480, U.S. Pat. No. 4,161,982, U.S. Pat. No. 4,161,983, U.S. Pat. No. 4,184,549, U.S. Pat. No. 4,192,382 and U.S. Pat. No. 4,194,563, disclose the injection of various surfactants and mixtures of surfactants which form coarse macroemulsions to reduce permeability.

Hess et al., "Chemical Method for Formation Plugging," *J. Pet. Tech.* 551, May 1971 disclose a process for injecting an acidic solution followed by furfuryl alcohol resin into a petroleum formation which flows preferentially into highly permeable zones and then forms a plug. The process is based on the acid-catalyzed polymerization of furfuryl alcohol resins. It is applied by injecting an acidic solution into the interval to be plugged, followed by the resin solution. The two solutions mix in the formation to start a rapid, vigorous exothermic reaction forming a hard solid that fills the pore space.

Terry et al., "Correlation of Gelation Times for Polymer Agents," *Soc. Pet. Eng. J.*, 229, April, 1981 disclose the use of gelled polymers (such as polyacrylamides) to redirect or modify reservoir fluid movement in the vicinity of injection or production wells for the purpose of improving water/oil ratios.

Other processes involve the use of hydrophilic polymers including partially hydrolyzed polyacrylamide, copolymers of acrylamide and acrylic acid or water soluble acrylates, polysaccharides, etc. Unfortunately, the fluids employing these hydrophilic polymers are substantially more viscous than water at the time of injection and so injection into the zones is difficult and there is little likelihood that they will invade the same zones as would be invaded by water or another aqueous fluid having about the same viscosity as water.

Accordingly, the effectiveness of the above-described processes has been restricted to reducing the permeability of only the most permeable flow channels in a zone and is furthermore usually restricted only to near wellbore zone of the formation, e.g. that portion of the most permeable zone in a formation immediately adjacent to the injection well, because of the difficulty of injecting viscous fluids through great portions of the formation.

Other methods which can overcome the problem of differential flow in subterranean petroleum formations and which will allow some tertiary oil recovery from the more permeable zones are of course desirable. There is a substantial need for a method of treating heterogeneous formations to reduce the permeability of the very high permeability zones to force subsequently injected oil displacing fluids to pass into those zones which were originally of lower permeability and thus were not invaded by the first injected fluids.

SUMMARY OF THE INVENTION

Accordingly, it is one object of the present invention to provide a method for recovering petroleum from a subterranean petroleum containing formation.

Another object of this invention is to provide a secondary petroleum recovery process for use in subterranean petroleum formations containing two or more zones which differ from one another in permeability.

A further object of the present invention is to provide a process for treating heterogeneous subterranean petroleum formations with poor vertical conformance to reduce the permeability of the very high permeability zones to force subsequently injected oil displacing fluids to pass into those zones which were originally of lower permeability.

These and other objects are achieved herein by a process of recovering petroleum from a subterranean petroleum-containing formation, said formation containing at least two distinct petroleum containing strata, said process comprising (a) injecting an aqueous solution containing oil displacing fluid into the formation, said fluid passing through at least one of the more permeable strata of said formation and displacing oil therein; and (b) thereafter injecting a surfactant containing oil displacing fluid into the formation to reduce the permeability of the oil depleted highly permeable zone, wherein said surfactant is a polymerizable surfactant having the general formula:

$$(R'-(OR'')_n-X)_yM$$

wherein R' is a polymerizable olefinically unsaturated linear or branched hydrocarbyl or hydrocarbyloxy group having from about 10 to about 22 carbon atoms, R" is ethylene, propylene or a mixture of ethylene and propylene, n is a number either whole or fractional from 0 to about 20, X is selected from the group consisting of O, SO$_3$, OSO$_3$, M is a cation selected from the group consisting of H, an alkali metal, an alkaline earth metal, ammonium and quaternary ammonium and y is a number from 1 to 2 inclusive, with the proviso that when X is O, M is H and y is 1 and when X is SO$_3$ or OSO$_3$, M is selected from the group consisting of an alkali metal, an alkaline earth metal, ammonium and quaternary ammonium and y is 1 or 2 depending upon the valence of M and wherein said surfactant containing oil displacing fluid further contains a polymerization initiater.

DETAILED DESCRIPTION OF THE INVENTION

The process of the present invention is applicable to subterranean petroleum-containing formations comprising two or more zones having different permeability which provides more effective surfactant waterflooding in both zones. In general, the present process involves first injecting an aqueous fluid which may or may not contain a conventional low surface tension surfactant (e.g. saturated, non-polymerizable) into the formation to pass through the more permeable zone and displacing petroleum therefrom. Typical conventional low surface tension surfactants useful for this purpose if desired are disclosed for example in R. L. Reed and R. N. Healy, "Some Physical Chemical Aspects of Microemulsion Flooding," D. O. Shah, Improved Oil Recovery By Surfactant and Polymer Flooding, Academic Press, N.Y. 1977, pp. 383-437. Thereafter a second aqueous fluid containing a polymerizable surfactant and a polymerization catalyst or initiator is injected into the formation which fluid will pass substantially exclusively into and through the most permeable, previously waterflooded zone. The aqueous solution containing the polymerizable surfactant and polymerization catalyst forms large oil-swelled aggregates stable to high temperature which selectively reduce the permeability of the highly permeable zones so that ordinary secondary waterflooding can be successfully accomplished in the adjacent lower permeability zones. Thus, after the treatment of the high permeability zone in accordance with the present invention, the permeability of the treated zone is at least no greater than and preferably less than, the permeability of the other zones. The above steps may then be repeated until all zones not previously contacted have been invaded.

Surfactants generally used in tertiary oil recovery processes have one or more aliphatic groups in their lipophilic tail(s). These aliphatic groups are usually saturated. It has been surprisingly discovered herein that when a polymerizable hydrocarbyl or hydrocarbyloxy group, such as alkenyl, alkynyl, aralkenyl, acrylic, styryl and the like is present at or near the end of the lipophilic tail(s), the surfactants organize themselves into large aggregates which in the presence of a polymerization initiator form polymeric aggregates capable of plugging the pores of the invaded stratum and thereby reducing the permeability thereof.

Suitable polymerizable surfactants for the purposes of the present invention have hydrocarbon tails with from about 10 to about 22 carbons which may be, for example, branched or linear aliphatic or contain such aliphatic radicals in combination with aromatic groups. The hydrophilic portion of the molecule may be for example polyalkoxy, polyalkoxy sulfate and polyalkoxy sulfonate and the like.

More specifically polymerizable surfactants which are suitable for the purposes of the present invention have the general structure:

$$(R'-(OR'')_n-X)_yM$$

wherein R' is a polymerizable olefinically unsaturated linear or branched hydrocarbyl or hydrocarbyloxy group having from about 10 to about 22 carbon atoms, R" is ethylene, propylene or a mixture of ethylene and propylene, n is a number either whole or fractional from 0 to about 20, preferably from about 3 to about 10, X is selected from the group consisting of O, SO$_3$ and OSO$_3$, M is a cation selected from the group consisting of H, an alkali metal, an alkaline earth metal, ammonium and quaternary ammonium and y is a number from 1 to 2 inclusive, with the proviso that when X is O, M is H and y is 1 and when X is SO$_3$ or OSO$_3$, M is selected from the group consisting of an alkali metal, an alkaline earth metal, ammonium and quaternary ammonium and y is 1 or 2 depending upon the valence of M. Quaternary ammonium cations include for example those having the structure

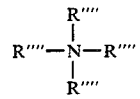

wherein R'''' may be the same or different, for example, an alkyl group having from 1 to about 3 carbon atoms, aryl such as phenyl or alkaryl such as benzyl. Typical alkali and alkaline earth metals include sodium, potassium, lithium, calcium, magnesium and the like. Preferably M is sodium or ammonium and most preferably sodium.

Representative R' groups include linear or branched alkenyl, e.g. decenyl, undecenyl, dodecenyl, hexadecenyl and the like, wherein the unsaturation may be in any position in the carbon chain which will allow polymerization to occur, preferably the unsaturation is in the terminal or 1-position. R' groups also include linear or branched alkynyl e.g. decynyl, dodecynyl, pentadecynyl and the like also wherein the unsaturation may be in any position in the carbon chain which will allow polymerization to occur and again is preferably in the terminal or 1-position and dienyl or trienyl groups wherein the unsaturation is conjugated or non-conjugated and preferably wherein at least one of the unsaturated sites is in the terminal or 1-position of the carbon chain. For the purposes herein, R' can also be arylalkylene groups such as

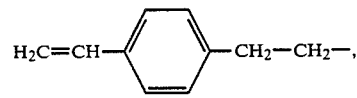

-continued

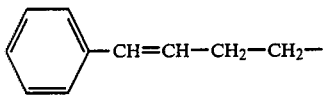

and the like. Further, R' may also be an unsaturated hydrocarbyloxy group, i.e. a group containing oxygen in addition to carbon and hydrogen, having the structure

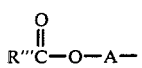

wherein R''' is alkenyl, alkynyl, dienyl or trienyl and A may be alkylene, arylenealkylene, arylalkylene, wherein the total number of carbon atoms in said structure

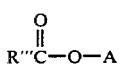

is from about 10 to 22. Thus, typical

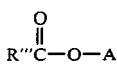

groups include, for example, acrylate, methacrylate, methylacrylate, ethylacrylate, ethylhexylacrylate, methylmethacrylate, tertiarybutylacrylate, oleylacrylate, stearylacrylate and the like.

If the polymerizable surfactants of the present invention are injected into a formation along with a suitable polymerization catalyst, polymerization of the surfactant begins in some but not all micelles or microemulsions. Those micelles or microemulsions in which polymerization has been initiated grow by accumulation of surfactant monomers from micelles or microemulsions in which polymerization has not been initiated in the same way polymers grow within micelles in the well known process of emulsion polymerization. As polymerization proceeds the aggregate swells, but becomes a rigid entity. It is this rigidity which is exploited in the practice of the present invention to lower the permeability of high permeability zones.

In accordance with the practice of the present invention, the emulsion particles formed by the process of the present invention are sufficiently large to offer resistance to flow through pores, are rigid so that they cannot be deformed and forced to flow and furthermore are polymeric entities so that mere changes in salinity, temperature and continued flow of water will not reduce their viscosity. In addition the polymeric aggregates thus formed are extremely thermally and hydrolytically stable both because the bonds which form the backbone of the polymer are carbon-carbon bonds and because scission of one or a few of the bonds cannot disrupt the structure as it would for a linear polymer. This is because aggregation depends not on polymerization but on properties of the monomers alone. It is believed that polymerization (or retention of polymerization) of as little as 10% of the surfactant molecules accomplish the desired effect.

In the process of this invention, injection of the polymerization surfactant slug produces residual oil from the more permeable zone by virtue of its low oil-water interfacial tension, but its primary effect is the reduction of the permeability of highly permeable zones so that ordinary secondary waterflooding can be successfully accomplished in those zones.

Polymerization catalysts suitable in the practice of the present invention include, for example, free radical polymerization initiators such as 2,2'-azobis(2-methylpropionitrile), benzoyl peroxide, cumene hydroperoxide and the like. While the initiator is preferably essentially oil soluble as those previously recited are, water soluble initiators such as potassium persulfate or t-butylhydroperoxide are also contemplated.

For the purposes of the present invention the polymerizable surfactant concentration generally ranges from about 0.4 to about 10% by weight of the injected fluid and the initiator concentration is chosen to provide polymerization of the surfactant within the time needed for injection of the slug at the temperature found in the reservoir. Typical catalyst concentrations are within the range of from about 0.1% to about 8% by weight. The process of the present invention is applicable at formation temperatures of from about 22° C. to about 140° C. in brines containing Ca, Na and/or Mg at from about 0 to about 15% total dissolved solids.

The volume of treating fluid to be injected into the formation when applying the process of the present invention is ordinarily from about 0.05 to about 1.0 and preferably from about 0.1 to about 0.25 pore volume percent, based on the pore volume of the high permeability zone or zones to be contacted by the treating fluid. It should be noted that the pore volume on which these numbers are based relate to the pore volume of the high permeability zone or zones to be treated, not the pore volume of the portion of the whole formation within the recovery zone defined by the wells utilized in the process.

The general procedural steps involved in carrying out the process of the present invention to a subterranean petroleum containing formation may be better understood by reference to the following description.

A subterranean petroleum containing formation is located for example at a depth of about 2000 feet and is determined to have a total formation thickness of for example 30 feet. The average salinity of the formation water is about 78,500 parts per million total dissolved solids including, for example, 16,000 parts per million divalent ions, e.g. calcium and magnesium. The formation temperature is e.g. 50° C. The formation is not homogenous in terms of permeability, however, rather the formation is made up of 3 separate statra or layers. The initial oil saturation in all layers is approximately 60 percent. The thickness and permeability of each zone is given in Table I below:

TABLE 1

| Zone | Thickness (feet) | permeability millidarcies |
|------|------------------|---------------------------|
| 1 | 5 | 600 |
| 2 | 5 | 20 |
| 3 | 20 | 100 |

After initial waterflooding to a residual oil concentration, 0.15 pore volume of an aqueous fluid containing 5 percent by weight of a surfactant of the present invention having the above formula wherein R' is

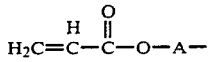

A is $(CH_2)_8$, R" is $-CH_2CH_2-$, X is $SO_3Na$ and n=4 and containing 0.2% by weight tert-butyl peroxybenzoate as a polymerization catalyst is injected into the injection well which is in fluid communication with the full vertical thickness of the formation, i.e. all strata of the formation. Since the permeability of the top stratum is substantially greater than the lower strata, the surfactant fluid flows much more readily into the top stratum.

Flow through the upper stratum continues for a few days to two weeks during which time the surfactant contacts some of the residual oil in the upper stratum, forms micelles swollen by this residual oil, and is polymerized with the aid of the polymerization catalyst which is, itself, slowly decomposing at the reservoir temperature. When about 5 to 20% of the surfactant has been polymerized, the swollen micelles become sufficiently rigid so that they no longer flow through the pores of the upper stratum and flow through that stratum ceases. Waterflooding of the more permeable strata is now commenced and proceeds in the fashion which would have been expected if no highly permeable zone had existed in the first place. Injection of polymerizable surfactant follows and these steps are continued until all the strata have been invaded. The water that is utilized for waterflooding is itself from the same formation and so the salinity of the water being injected into the formation and the salinity of water naturally present in the formation are about the same.

The following examples are given by way of illustration in order to enable those of ordinary skill in the art to better understand the invention.

EXAMPLE 1

The following is an example of a parallel flood experiment which demonstrates the feasibility of the present method.

In this parallel flood experiment it is only the brine flush aspect of the experiment that is done in a parallel configuration. Prior to this, the core and sandpack are threaded individually. A sandstone core (Cleveland Quarries, 1×24" 500 millidarcies nominal) is prepared by covering with heat-shrink Teflon tubing (Cadillac Plastic and Chemical Co., 1" nominal shrunken diameter) and is then placed in a Hassler cell (Temco, Inc. model DCH-3). A sandpack is made by slowly admitting sand (ca. 545 g. of 40-325 mesh Berea, Cleveland Quarries) into a tube (0.870×36" stainless steel) while it is being lightly rapped. Small sand particles are confined between the opposing end frits (30 mesh standless steel wire screen) by glass wool plugs. Gas permeabilities are determined. The pore volumes (PV) are then determined by metering a synthetic (7.85% total salinity) brine into each after thorough evacuation (vacuum pump for 2 hours). The synthetic brine contains sodium, calcium and magnesium cations in the ratio 6.24% NaCl, 1.64% $CaCl_2.2H_2O$, and 0.726% $MgCl_2.H_2O$. Following the PV determination the brine permeability is determined. Each core and sandpack is then flooded with topped West Burkburnette crude oil to irreducible water saturation. The amount of brine collected in the effluent from this step is the volume of oil retained by the core or sandpack.

After these preparatory steps, the core and sandpack are placed in a parallel configuration. This comprises common fluid injection through a tee. Line volumes on both arms of the tee are minimized. The output from the core and sandpack are not tied together. Instead, they are individually collected. Care is taken that the exit line tips are placed at the same height to minimize equal backpressure.

Brine flush is started at a rate corresponding to 1 foot per day linear advance through the system. Since most of the flow prefers to bypass the core, the flow through the sandpack is as much as 1.7 ft/day. Pressure drops are monitored across the core (equal to that across the sandpack), the first 6" of the core, the middle 12" of the core, and each third of the sandpack. Fractions are collected and quantified. Initially only oil is produced and essentially only from the sandpack. When the oil cut from the sandpack drops below 10%, injection of a 0.2 pore volume (on the basis of the sandpack pore volume) solution of 8% by weight of a surfactant of the present invention having the above formula where

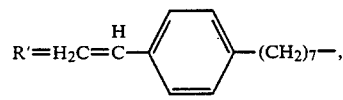

R"=$-CH_2CH_2-$, X=$OSO_3Na$ and n=4, and 1.0% tert-butyl hydroperoxide in the synthetic brine is injected followed by synthetic brine. Pressure is seen to slowly rise throughout the first and second thirds of the sandpack. Finally the resistance to flow through the sandpack is such that flow essentially ceases from the sandpack and begins through the core. Since the core is now experiencing its initial waterflooding, only oil is produced from the core followed by oil and brine as is expected for a normal waterflood process.

Obviously, other modifications and variations of the present invention are possible in light of the above teachings. It is therefore to be understood that changes may be made in the particular embodiments of this invention which are within the full intended scope of the invention as defined by the appended claims.

I claim:

1. A process for recovering petroleum from a subterranean petroleum-containing formation said formation containing at least two distinct petroleum containing strata, said process comprising
   (a) injecting an aqueous oil displacing fluid into the formation, said fluid passing through at least one of the more permeable strata of said formation and displacing oil therein; and therafter
   (b) injecting a surfactant containing oil displacing fluid into the formation to reduce the permeability of the oil depleted highly permeable zone, wherein said surfactant is a polymerizable surfactant having the general formula:

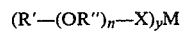

wherein R' is a polymerizable olefinically unsaturated linear or branched hydrocarbyl or hydrocarbyloxy group having from about 10 to about 22 carbon atoms, R" is ethylene, propylene or a mixture of ethylene and propylene, n is a number either whole or fractional from 0 to about 20, X is selected from the group consisting of O, $SO_3$ and $OSO_3$, M is a cation selected from the group consisting of H, an alkali metal, an alkaline earth metal, ammonium and quaternary ammonium and y is a number from 1 to 2 inclusive, with the proviso that when X is 0, M is H and y is 1 and when X is SO₃ or OSO₃, M is selected from the group consisting of an alkali metal, an alkaline earth metal, ammonium and quaternary ammonium and y is 1 or 2 depending upon the valence of M and said surfactant containing oil displacing fluid further contains a polymerization initiator.

2. The process according to claim 1 wherein R' is a hydrocarbyloxy group having the structure

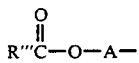

wherein R''' is selected from the group consisting of alkenyl and alkynyl, A is selected from the group consisting of alkylene, arylene, arylalkylene and alkylenearylene and wherein the total number of carbon atoms in said group

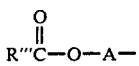

is from about 10 to about 22.

3. The process according to claim 1 wherein said polymerization initiator is selected from the group consisting of 2,2'-azobis(2-methylpropionitrile), benzoyl peroxide, t-butylperbenzoate, di-t-butylperoxide, cumene hydroperoxide, potassium persulfate and t-butylhydroperoxide.

4. The process according to claim 1 wherein said polymerizable surfactant is present in a concentration in the range of from about 0.4% to about 10% by weight.

5. The process of claim 1 wherein R' is the group

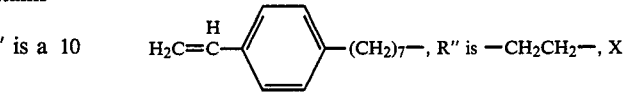

is OSO₃Na and n=4.

6. The process according to claim 1 wherein R' is the group

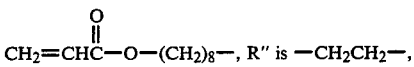

X is SO₃Na and n=4.

7. The process according to claim 1 wherein said polymerization initiator is tert-butylhydroperoxide.

8. The process according to claim 1 wherein steps (a) and (b) are repeated until all permeable strata have been invaded.

9. The process according to claim 1 wherein the aqueous oil displacing fluid of step (a) contains a low surface tension surfactant.

* * * * *